(12) United States Patent
Sato et al.

(10) Patent No.: US 8,372,366 B2
(45) Date of Patent: *Feb. 12, 2013

(54) NOX PURIFYING CATALYST

(75) Inventors: Naohiro Sato, Saitama (JP); Osami Yamamoto, Saitama (JP); Koichi Inaba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 91 days.

This patent is subject to a terminal disclaimer.

(21) Appl. No.: 12/669,309

(22) PCT Filed: Jul. 4, 2008

(86) PCT No.: PCT/JP2008/062186
§ 371 (c)(1),
(2), (4) Date: Jan. 15, 2010

(87) PCT Pub. No.: WO2009/011236
PCT Pub. Date: Jan. 22, 2009

(65) Prior Publication Data
US 2010/0190634 A1    Jul. 29, 2010

(30) Foreign Application Priority Data
Jul. 17, 2007    (JP) ................. 2007-185492

(51) Int. Cl.
*B01D 53/56* (2006.01)
*B01D 53/34* (2006.01)
*B01J 21/00* (2006.01)
*B01J 29/06* (2006.01)

(52) U.S. Cl. .............. 423/235; 423/237; 423/239.2; 502/74; 502/64

(58) Field of Classification Search .............. None
See application file for complete search history.

(56) References Cited

U.S. PATENT DOCUMENTS

| 6,689,709 B1 * | 2/2004 | Tran et al. ............. 502/65 |
| 6,956,008 B2 * | 10/2005 | Takeshima et al. ........ 502/326 |
| 2003/0083197 A1 * | 5/2003 | Noda et al. ............. 502/344 |
| 2007/0144156 A1 * | 6/2007 | Gandhi et al. ............. 60/297 |
| 2008/0034740 A1 * | 2/2008 | Strehlau et al. ............ 60/299 |

FOREIGN PATENT DOCUMENTS

| EP | 2 048 333 A1 | 4/2004 |
| EP | 1 685 891 A1 | 8/2006 |
| EP | 1 889 651 A1 | 2/2008 |
| JP | 05-220403 A | 8/1993 |
| JP | 06-111838 A | 4/1994 |
| JP | 06-316416 A | 11/1994 |
| JP | 2600492 B2 | 1/1997 |
| JP | 11-300211 A | 11/1999 |
| JP | 2001251332 * | 2/2003 |
| JP | 2005-177570 A | 7/2005 |
| JP | 2006-314989 A | 11/2006 |
| JP | 2007-167817 A | 7/2007 |
| WO | WO 93/07363 A1 | 4/1993 |
| WO | WO 98/26867 A1 | 6/1998 |
| WO | WO 2005/044426 A1 | 5/2005 |
| WO | WO 2007/074599 A1 | 7/2007 |

* cited by examiner

*Primary Examiner* — Melvin C Mayes
*Assistant Examiner* — Sheng H Davis
(74) *Attorney, Agent, or Firm* — Arent Fox LLP

(57) ABSTRACT

Disclosed is a NOx purifying catalyst which is capable of removing NOx sufficiently efficiently even during operations at low temperatures such as operations in diesel cars. Specifically disclosed is a NOx purifying catalyst for processing NOx in an exhaust gas by performing lean/rich control of air/fuel ratio of the exhaust gas. This NOx purifying catalyst comprises at least a first catalyst layer containing a β zeolite containing iron element and a cerium oxide material and a second catalyst layer containing a noble metal, a cerium oxide material and a heat-resistant inorganic oxide. The second catalyst layer and the first catalyst layer are sequentially arranged on a carrier in such a manner that the first catalyst layer forms the uppermost layer.

5 Claims, 1 Drawing Sheet

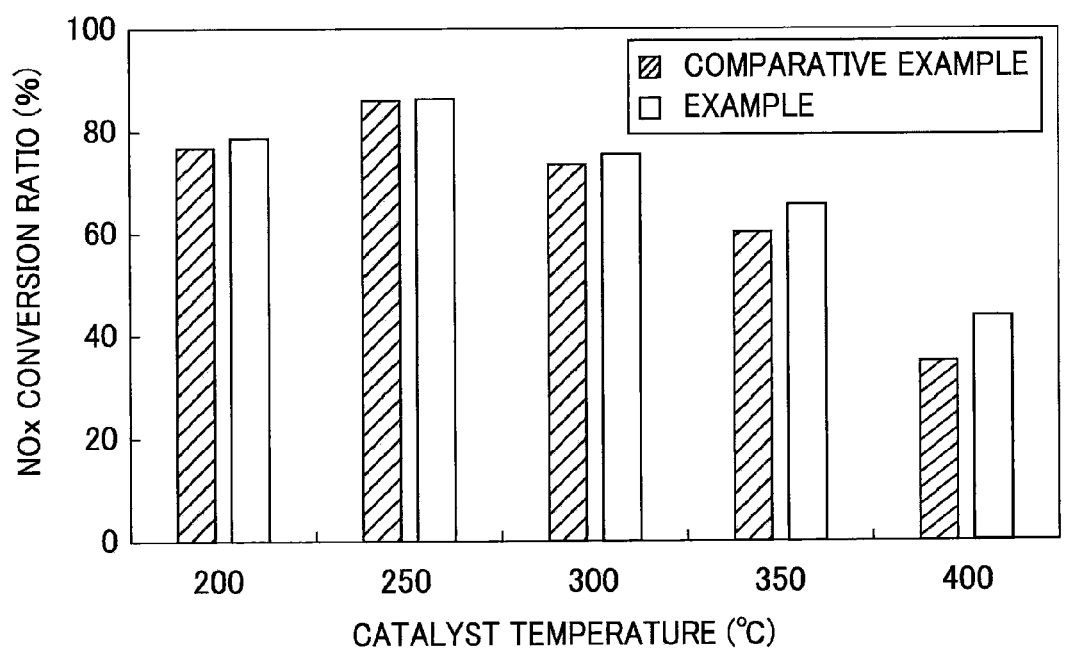

NOX PURIFYING CATALYST

CROSS-REFERENCED TO RELATED APPLICATION

This application is a National Stage entry of International Application No. PCT/JP2008/062186, filed Jul. 4, 2008, which claims priority to Japanese Patent Application No. 2007-185492 filed Jul. 17, 2007, the disclosure of the prior application is incorporated in its entirety by reference.

TECHNICAL FIELD

The present invention relates to a NOx purifying catalyst that can remove NOx, for example, in the exhaust gas of an automobile or the like with sufficient efficiency, and more specifically relates to a NOx purifying catalyst that can remove NOx with sufficient efficiency even under a low temperature operating range such as that of a diesel vehicle.

BACKGROUND ART

Thus far, a NOx purifying catalyst has been researched that can effectively decrease NOx (nitrogen oxide) in the exhaust gas of an automobile or the like. Above all, decreasing NOx along with PM (particulate matter) has been an important issue in diesel vehicles.

In diesel vehicles, typically, an oxidation catalyst (DOC) and a diesel particulate filter (DPF) have been arranged in the exhaust path of the diesel engine. However, in the case of further decreasing NOx being demanded in the future, a simple combination of the conventional DOC/DPF will not be sufficient.

Thus, as a method to further decrease NOx in exhaust gas, for example, an exhaust gas purifying apparatus of an internal combustion engine has been disclosed in Patent Document 1 detailed below that is configured so as to use a NOx absorbent that absorbs NOx when the air/fuel ratio of the exhaust gas is lean and releases the NOx thus absorbed if the oxygen concentration in the exhaust gas drops, and the NOx absorbed when the exhaust gas is lean is released from the NOx absorbent when the oxygen concentration in the exhaust gas has dropped.

Patent Document 1: Japanese Patent Publication No. 2600492

DISCLOSURE OF THE INVENTION

Problems to be Solved by the Invention

However, the NOx absorbent used in the exhaust gas purifying apparatus of Patent Document 1 employs an alkali metal, alkali earth metal, or the like. Furthermore, a noble metal such as platinum is used in the oxidation of HC, CO and NOx in a lean state and the reduction of NOx in a rich state. Due to this, there has been a problem in that the activity of the noble metal drops easily, and particularly the NOx purification ability at low temperatures drops, since a material with strong basicity is used as the NOx absorbent in Patent Document 1.

In addition, since a material with strong basicity is used as the NOx absorbent, the binding thereof with SOx, which has stronger acidity than NOx, becomes stronger. As a result, there has also been a problem in that catalyst regeneration at low temperatures is difficult because higher temperatures become necessary in regeneration after sulfur poisoning.

More specifically, the NOx purification catalyst described in Patent Document 1 achieves a predetermined effect in the case of operating mainly in a high temperature range such as that of a gasoline engine; however, in the case of the operating range often being no greater than 300° C., for example, such as for a diesel engine, the NOx decreasing effect is insufficient.

The present invention takes into account the above problems, and has an object of providing a NOx purifying catalyst that can remove NOx with sufficient efficiency, even under a low temperature operating range such as that of a diesel vehicle.

Means for Solving the Problems

The present inventors have discovered that the removal efficiency of NOx under a low temperature operating range could be improved by combining a first catalyst layer that includes a beta zeolite having elemental iron and a cerium oxide-based material, and a second catalyst layer that includes a noble metal, a cerium oxide-based material, and a heat resistant inorganic oxide, and laminating so as to make the first catalyst layer the top layer, thereby arriving at completing the present invention. More specifically, the present invention provides the following.

According to a first aspect, in a NOX purifying catalyst used for purification of NOx in exhaust gas emitted from an internal combustion engine in which an air/fuel ratio is controlled to be in a lean or rich state, the catalyst includes a first catalyst layer and a second catalyst layer;

NOx passes through the first catalyst layer, and the NOx having thus passed through is oxidized and adsorbed by the second catalyst layer, in the lean state; the NOx thus adsorbed by the second catalyst layer is converted to $NH_3$ by a reducing component on the second catalyst layer, and then the $NH_3$ is adsorbed by transferring to the first catalyst layer, in the rich state; the $NH_3$ subsequently reacts with NOx to be converted to nitrogen and water; the first catalyst layer includes a cerium oxide-based material and a beta zeolite having elemental iron; the second catalyst layer includes a noble metal, a cerium oxide-based material, and a heat resistant inorganic oxide; and the second catalyst layer and the first catalyst layer are sequentially laminated on a carrier, and the first catalyst layer is formed so as to be a top layer.

The NOx purifying catalyst according to the first aspect of the invention removes NOx with sufficient efficiency in the below way. In a state in which the air/fuel ratio of the exhaust gas is lean, the NOx in the exhaust gas first easily passes through the first catalyst layer of the upper layer, which is a solid acid catalyst, and then reaches the second catalyst layer being the lower layer. The NOx contacts the second catalyst layer, and is temporarily adsorbed (temporarily stored) to the second catalyst layer while being oxidized by the noble metal such as platinum in the second catalyst layer. Here, the noble metal such as platinum functions as a catalytically active species that oxidizes NOx (e.g., NO to $NO_2$).

Next, the air/fuel ratio of the exhaust gas is made to be a rich state. When this is done, the NOx adsorbed to the second catalyst layer is converted to ammonia by way of hydrogen generated in the water-gas shift reaction, and this ammonia travels to the first catalyst layer and is adsorbed (stored again). This storing again takes place easily due to the second catalyst layer and the first catalyst layer being laminated to be adjacent.

Thereafter, when the air/fuel ratio of the exhaust gas is returned to lean again, ammonia stored again in the first catalyst layer and the NOx contained in the exhaust gas are converted to nitrogen and water by way of the ammonia selective catalytic reduction process, and this nitrogen is released from the surface of the first catalyst layer. At this time, since the first catalyst layer is the top layer, the nitrogen thus reduced is efficiently released from the top most surface. It should be noted that, at this time, the above-mentioned temporary storage progresses in concert.

In the above way, in the lean state, NOx is temporarily stored inside the second catalyst layer, and the ammonia stored again inside the first catalyst layer is converted to nitrogen and water, and released, by repeatedly carrying out lean/rich control of the exhaust gas in predetermined cycles. Meanwhile, in the rich state, the NOx thus being temporarily stored is converted to ammonia and stored again in the first catalyst layer. By this means, it is possible to continuously purify NOx. Then, since a sequence of a cycle, which is defined by temporary storage of NOx, conversion to ammonia, storing again of ammonia, reduction and release as nitrogen, takes place more efficiently by making a layered configuration in which the top layer is the first catalyst layer and the lower layer is the second catalyst layer, it is possible to improve the NOx decreasing efficiency. It should be noted that the above-mentioned operation is explained in more detail in the embodiments described later.

Furthermore, the solid acid catalyst of the first catalyst layer in the present invention is a beta zeolite containing elemental iron. Since the beta zeolite excels in ammonia adsorption capacity even as NOx passes therethrough, and is also comparatively high in heat resistance, it is suitably used in the present invention. It should be noted that, as described below, it is preferable for the beta zeolite to be ion-exchanged with Fe.

Furthermore, the first catalyst layer in the present invention is characterized in containing a cerium oxide-based material in addition to a beta zeolite containing elemental iron. As a result, the NOx adsorptive ability of the first catalyst layer is improved, and the reaction with $NH_3$ supplied from the second catalyst layer is promoted.

In addition, the second catalyst layer contains a noble metal, a cerium oxide-based material, and a heat resistant inorganic oxide. With this configuration, the above-mentioned temporary storage of NOx and storing again progress efficiently.

It should be noted that, by including a heat resistant inorganic oxide such as alumina, the generation of hydrogen in the second catalyst layer by way of the water-gas shift reaction takes place with good efficiency at 300° C. and above. As a result, conversion from NOx to ammonia in the rich state can be carried out with higher efficiency.

It should be noted that, in the NOx purifying catalyst of the present invention, "adsorption" is carried out in two steps of temporary storage and storing again, without "absorbing" NOx so as to be captured internally, as in the NOx absorbent of Patent Document 1 mentioned above. In addition, an alkali metal, alkali earth metal or the like having strong basicity is not used. As a result, superior effects are achieved that are not found conventionally in that the catalytic activity of the noble metal does not drop even at low temperatures, and NOx can be removed with sufficient efficiency even under a low temperature operating range that is mainly 300° C. or lower such as in a diesel vehicle.

Here, a lean state indicates a state in which the air to fuel ratio (air/fuel ratio) is large (i.e. a state in which the fuel concentration is low), and a rich state indicates a state in which the air to fuel ratio (air/fuel ratio) is small (i.e. a state in which the fuel concentration is high).

According to a second aspect, in the NOx purifying catalyst according to the first aspect, at least a portion of the beta zeolite in the first catalyst layer is ion-exchanged with elemental iron in the first catalyst layer; and in the second catalyst layer, the noble metal has platinum as an essential component, and the heat resistant inorganic oxide is gamma alumina.

According to the second aspect, by at least a portion of the beta zeolite being ion-exchanged with elemental iron in the first catalyst layer, adsorption of NOx and a reducing component to the zeolite is promoted by the elemental iron thus exchanged. In addition, by making platinum an essential component of the noble metal in the second catalyst layer, NO accounting for a large portion in the exhaust gas is oxidized to $NO_2$, and reaction thereof with a reducing component is promoted from this $NO_2$ being easily adsorbed to cerium. Furthermore, since gamma alumina has a high specific surface area and excels in heat resistance, it is suitably employed in the present invention. It should be noted that, in order to improve heat resistance, it is more preferable to use this gamma alumina in which a small amount of lanthanum is captured inside crystals.

According to a third aspect, in the NOx purifying catalyst according to the first or second aspect, the beta zeolite having elemental iron in the first catalyst layer further includes elemental cerium.

According to the third aspect, by adding elemental cerium, adsorption of NOx is carried out by the oxygen storage/release ability, and suppression of catalyst poisoning can be expected due to the reducing component from the oxygen storage/release ability. By using both components together in this way, these functions act synergistically and a more superior effect as a catalyst is exhibited.

According to a fourth aspect, in the NOx purifying catalyst as described in any one of the first to third aspects, the cerium oxide-based material is at least one of cerium oxide, and a composite oxide of a rare-earth element and cerium.

According to the fourth aspect, adsorption of NOx to the second catalyst layer is promoted by using cerium oxide and/or a composite oxide of a rare-earth element and cerium, and preferably cerium oxide and the composite oxide, as the cerium oxide-based material. In addition, NOx adsorptive ability is improved, and reaction with $NH_3$ supplied from the second catalyst layer is promoted in the first catalyst layer. It should be noted that at least one element selected from rare-earth elements such as praseodymium (Pr), lanthanum (La) and neodymium (Nd) are preferred as the rare-earth element.

According to a fifth aspect, in the NOx purifying catalyst as described in any one of the first to fourth aspects, the reducing component is at least one component in the exhaust gas selected from the group consisting of carbon monoxide, a hydrocarbon component, and hydrogen generated from at least one of the carbon monoxide and hydrocarbon component contacting the second catalyst layer.

In the present invention, NOx adsorbed to the second catalyst layer in a rich state is converted to $NH_3$ by reducing components on the second catalyst layer as described above. At this time, according to the fifth aspect, NOx adsorbed on the second catalyst layer can be efficiently converted to $NH_3$ by using the above reducing component or hydrogen in the exhaust gas.

According to a sixth aspect, in the NOx purifying catalyst as described in any one of the first to fifth aspects, the second catalyst layer is configured so that content of the noble metal decreases sequentially or step-wise from a side of the first catalyst layer toward a carrier side thereof.

According to the sixth aspect, since noble metal is abundantly present at a region more toward the top side (side near the top most surface) of the second catalyst layer, oxidation of NOx and production of ammonia from the water-gas shift reaction become dominant in the lean state. On the other hand, since there is a region in which little to no noble metal is present at a lower side (side near the carrier) region of the second catalyst layer, temporary storage of NOx becomes dominant. Accordingly, NOx decreasing efficiency can be further improved.

It should be noted that, although there is no particular limitation to a configuration such that "content of the noble metal decreases sequentially or step-wise from a side of the first catalyst layer towards a carrier side", it may be a configuration in which an amount of noble metal decreases continuously in a thickness direction of the layers, and may be a configuration such that the second catalyst layer is formed by multiple layers of at least two layers, and the amount of noble metal in each layer decreases step-wise. It should be noted that a case of having a layer that does not substantially contain noble metal at a carrier side of the layer is also included in the aspects of the present invention.

Effects of the Invention

According to the present invention, it is possible to provide a NOx purifying catalyst that can remove NOx with sufficient efficiency even in an operation range in which the catalyst temperature is in a low region. As a result, the present invention can be suitably used in a diesel vehicle or the like.

BRIEF DESCRIPTION OF THE DRAWINGS

FIG. 1 is a chart showing characteristics of NOx conversion versus catalyst temperature according to an embodiment.

PREFERRED MODE FOR CARRYING OUT THE INVENTION

Hereafter, an example of a NOx purifying catalyst according to the present invention is explained in detail.

NOx Purifying Catalyst Configuration

The NOx purifying catalyst according to the present embodiment is a catalyst of integrated structure type composed of a carrier coated with at least two different catalyst layers, and is provided with at least a first catalyst layer that includes a zeolite-based catalyst having elemental iron and a cerium oxide-based material, and a second catalyst layer that includes a noble metal, a cerium oxide-based material and a heat resistant inorganic oxide.

First Catalyst Layer

Constituents

In the NOx purifying catalyst of the present invention, the first catalyst layer is preferably used as a top surface layer that directly contacts the exhaust gas. In addition, it preferably does not substantially include a platinum component, and more preferable does not include any noble metal component.

This first catalyst layer includes a solid acid catalyst having ammonia adsorption capacity, and a cerium oxide-based material. A beta zeolite catalyst is used as the solid acid catalyst. In addition, this beta zeolite includes elemental iron. Although the reason why the exhaust gas purification ability, and particularly the NOx purification ability, is improved by adding elemental iron to the zeolite catalyst is not exactly known, it is assumed that adsorption of NOx and reducing components to the zeolite is promoted by elemental iron.

It should be noted that elemental cerium may be added and ion-exchanged in addition to elemental iron. By adding elemental cerium, adsorption of NOx is carried out by the oxygen storage/release ability, and suppression of catalyst poisoning can be expected due to the reducing component from the oxygen storage/release ability. By using both components together in this way, these functions act synergistically and a more superior effect as a catalyst is displayed.

The beta zeolite employed in the present invention has a relatively complex three-dimensional pore structure consisting of generally linear pores having a relatively large diameter arranged in one direction and curved pores intersecting these, and thus has a property such that diffusion of cations during ion-exchange and diffusion of hydrocarbon molecules during reduction is easy. This is recognized to be a unique structure compared to mordenite, faujasite, and the like, which only have linear holes arranged in one direction. In addition, since beta zeolite also has high thermal durability due to such structural characteristics, it is possible to impart superior heat resistance to the catalyst by use as the catalyst to be employed in the present invention.

The addition of elemental iron or elemental cerium to the beta zeolite of the present invention can be performed by adding to the beta zeolite as an iron salt or cerium salt solution; however, a commercially available beta zeolite prepared with elemental iron and elemental cerium added may also be used.

In addition, according to a beta zeolite made in this way, it is possible to prepare a situation in which elemental iron or elemental cerium is ion-exchanged to cation sites of the beta zeolite. In the case of a beta zeolite thus ion-exchanged, the NOx purification ability of the present invention is improved; however, it has be considered whether one of the main causes for this is the stabilizing of the skeletal structure of the beta zeolite by ion-exchange.

Furthermore, the first catalyst layer in the present invention is characterized as having a cerium oxide-based material in addition to the above-mentioned beta zeolite. In this way, the NOx adsorptive ability of the first catalyst layer is improved, and reaction with $NH_3$ supplied from the second catalyst layer is promoted. As the cerium oxide-based material employed in the present invention, cerium oxide or a cerium oxide-zirconium oxide composite oxide, or a material to which a variety of auxiliary materials have been added to these oxides can be used. It should be noted that, in the case of employing a cerium oxide-zirconium oxide composite oxide, containing at least 10 wt % of cerium by oxide conversion in the composite oxide is preferred, containing at least 30 wt % is more preferred, and containing at least 50 wt % is most preferred. It should be noted that the cerium oxide is preferably pure cerium oxide that is substantially composed of cerium and oxygen (at least 95 wt % cerium and oxygen).

It is possible to add a rare-earth element such as praseodymium, neodymium, lanthanum, samarium and cerium as additives to the cerium oxide-based material employed in the present invention. Such additives are captured inside the crystal structure of the cerium oxide-based material, and preferably exist stably in a state such as a metal or oxide. It is possible that heat resistance and durability of the cerium oxide-based material are improved by existing in this way.

Thus, cerium oxide and/or a composite oxide of cerium and a rare-earth element are preferred as the cerium oxide-based material, which is a cerium oxide-based material such as cerium oxide and the composite oxide, for example, such as $CeO_2 + Ce\text{---}Pr\text{---}La\text{-}Ox$.

Although a commercially available cerium oxide-based material may be used as the cerium oxide-based material, it can be obtained by a well-known method. For example, according to the method described in Japanese Patent Application Publication No. H06-316416, it can be obtained by mixing cerium sol with a nitrate such as of praseodymium, neodymium, lanthanum and samarium, and zirconium sol as required, and then drying and firing.

Blending Amount of Each Constituent

The blending amount of beta zeolite contained in the first catalyst layer can be suitably set and is not particularly limited; however, it is preferably 5 to 300 g/L per unit volume of the overall catalyst of the present invention, and more preferably 30 to 150 g/L. If the blending amount is at least 5 g/L, it is possible to exhibit the exhaust gas purification ability according to the present invention, and if no greater than 300 g/L, air permeability of exhaust gas in the honeycomb can be sufficiently maintained.

In addition, elemental iron added to inside the beta zeolite is preferably 0.1 to 10 wt % by oxide conversion relative to the zeolite, and is more preferably 0.5 to 5 wt %. If the added amount exceeds 10 wt %, the active solid acid sites can no longer be maintained and activity drops, and heat resistance also drops, and as long as it is no less than 0.1 wt %, sufficient NOx purification performance can be obtained.

In the case of additionally adding elemental cerium, the elemental cerium added into the beta zeolite is preferably 0.05 to 5 wt % by oxide conversion relative to the zeolite, and more preferably 0.1 to 3 wt %. If at least 0.05 wt %, catalyst poisoning by reducing components in the exhaust gas can be prevented; however, if it exceeds 5 wt %, the active solid acid sites cannot be maintained, and the activity and heat resistance drops.

The cerium oxide-based material employed in the first catalyst layer is preferably 1 to 300 g/L per unit volume of the overall catalyst of the present invention, and more preferably 10 to 200 g/L. If the blending amount is at least 1 g/L, it is possible to exhibit the exhaust gas purification ability of the present invention, and if no greater than 300 g/L, air permeability of exhaust gas in the honeycomb can be sufficiently maintained. It should be noted that, in the case of using cerium oxide and the composite oxide, the ratio thereof is preferably set in the range of 100:0 to 50:50 cerium oxide to composite oxide. In addition, for the zirconium oxide-based material, although the blending amount thereof can be suitably set and is not particularly limited, it is preferably 5 to 50 g/L, and more preferably 10 to 30 g/L. It should be noted that the cerium oxide-based material employed may be used by combining two or more types thereof.

Second Catalyst Layer

Constituents

The second catalyst layer includes a noble metal as a catalytically active species, a cerium oxide-based material, and a heat resistant inorganic oxide such as alumina.

Although gold, palladium, and rhodium can be used as necessary as noble metals, since the activity is high for that in which platinum is the essential component, it is preferred that platinum is employed as a main component. Here, main component indicates platinum being contained to be at least 50 wt % of the overall noble metal.

The noble metal is employed by supporting on a heat resistant inorganic oxide; however, as such a heat resistant inorganic oxide, so long as being an inorganic oxide such as a zirconium oxide-based material, an alumina-based material, a zeolite-based material, a silica-based material, it can be broadly selected from among these, in addition to the cerium oxide-based material used in the second catalyst layer of the present invention. In addition, in regards to supporting onto the heat resistant inorganic oxide, it is also possible to be supported entirely on a heat resistant inorganic oxide that configures the second catalyst layer; however, it may be supported on a specific inorganic oxide as well.

A cerium oxide-based material is added to the second catalyst layer in addition to noble metal such as platinum. This is because NOx purification ability is improved by synergism between the cerium oxide-based material and the noble metal such as platinum. Although the reason that the NOx purification ability is improved in this way is not exactly known, the poisoning of platinum being prevented by the reducing component and the adsorption function of NOx can be considered as causes thereof.

Since the cerium oxide-based material employed in the second catalyst layer can be similar materials to the first catalyst layer, descriptions thereof have been omitted. It should be noted that the cerium oxide-based material may be the same as in the first catalyst layer and the second catalyst layer, or may be different.

Alumina, which is a heat resistant inorganic oxide, is further added to the second catalyst layer. The above described noble metal is employed by supporting to the cerium oxide-based material and/or alumina. Gamma alumina is preferable as the alumina due to having high specific surface area and excelling in heat resistance.

Blending Amount of Each Constituent

The amount of noble metal of the catalytically active species used in the second catalyst layer is preferably 0.1 to 20 g/L per unit volume of the overall catalyst of the present invention, and more preferably 1 to 10 g/L. If the blending amount is at least 0.1 g/L, purification ability can be exhibited, and a further improving effect is no longer expected even if exceeding 20 g/L.

Here, in a case where a noble metal other than platinum is used in combination as the catalytically active species, the amount of platinum is preferably at least 50% relative to the overall amount of noble metal, more preferably at least 70%, and most preferably at least 90%.

The heat resistant inorganic oxide employed in the second catalyst layer (including alumina) is preferably 10 to 300 g/L per unit volume of the overall catalyst of the present invention, and more preferably 30 to 150 g/L. If the amount used is at least 10 g/L, it is possible to support the noble metal that may exhibit exhaust gas purification ability according to the present invention, and if no greater than 300 g/L, air permeability of exhaust gas in the honeycomb can be sufficiently maintained.

The cerium oxide-based material employed in the second catalyst layer is preferably 1 to 300 g/L per unit volume of the overall catalyst of the present invention, and more preferably 10 to 200 g/L. If the blending amount is at least 1 g/L, it is possible to exhibit the exhaust gas purification ability according to the present invention, and if no greater than 300 g/L, air permeability of exhaust gas in the honeycomb can be sufficiently maintained. It should be noted that, in the case of using cerium oxide and the composite oxide, the ratio thereof is preferably set in the range of 100:0 to 50:50 cerium oxide to composite oxide. In addition, as the zirconium oxide-based material, although the blending amount thereof can be suitably set and is not particularly limited, it is preferably 5 to 50 g/L, and more preferably 10 to 30 g/L. It should be noted that the cerium oxide-based material employed may be used by combining two or more types thereof.

It should be noted that the blending ratio of the cerium oxide-based material contained in the first catalyst layer and the cerium oxide-based material contained in the second catalyst layer is preferably in the range of 5:95 to 80:20.

Other Components

A heat resistance improving component or strength improving component such as alumina and silica, and an adhesion improving component (binder) and the like, for example, may be blended into the first catalyst layer and/or the second catalyst layer as other components.

A zirconia-based compound, an alumina-based compound, a silica-based compound or the like can be exemplified as the binder. In addition, an alkali, alkaline earth, noble metal component or the like such as potassium, rubidium, cesium, magnesium, calcium, strontium, barium, antimony, hafnium, tantalum, rhenium, bismuth, gadolinium, holmium, thulium, ytterbium, germanium, selenium, cadmium, indium, scandium, titanium, niobium, chromium, and silver can be exemplified as the heat-resistance improving component or the strength improving component.

Layer Formation of First Catalyst Layer and Second Catalyst Layer

The NOx purifying catalyst of the present invention is characterized in that the dispositional relationship between the first catalyst layer and the second catalyst layer is specified. That is, the second catalyst layer and the first catalyst layer are sequentially laminated on the carrier, and are preferably configured so that the first catalyst layer is the top layer. In addition, the second catalyst layer being the lower layer is preferably configured so that the noble metal content decreases sequentially or step-wise from the first catalyst layer side thereof towards the carrier side thereof. This means that it is not necessary for the lower layer to always be one layer, and it may be configured by multiple layers so that the noble metal content decreases sequentially or step-wise.

Operation of NOx Decreasing System

Next, operation of a NOx decreasing system with the NOx purifying catalyst according to the present invention will be explained. One example of the NOx purifying catalyst is a catalyst having the constitution shown in Table 1 below, and composed of a two layer configuration including the upper layer and lower layer used in the Examples described later. In this example, the upper layer corresponds to the first catalyst layer of the present invention, and the lower layer corresponds to the second catalyst layer of the present invention.

TABLE 1

|  | Composition |
| --- | --- |
| Upper Layer | Fe-ion exchanged Beta zeolite $CeO_2$ $\gamma$-$Al_2O_3$ Zirconia |
| Lower Layer | Pt $CeO_2$ $\gamma$-$Al_2O_3$ |

Operation in Low Temperature Range

First Lean State

First, in a state in which the air/fuel ratio of exhaust gas is made lean (normal operating state for a diesel engine), NOx in the exhaust gas passes through the upper layer (first catalyst layer), reaches the lower layer (second catalyst layer) and the NOx is oxidized (e.g., NO to $NO_2$) by noble metal (Pt in this case), while this $NO_2$ is temporarily stored by being temporarily adsorbed to the lower layer (both in the second catalyst layer). At this time, Pt functions as an oxidation catalyst, and $CeO_2$ in the lower layer functions as a NOx adsorbent.

Rich State

Next, when a state is entered in which the air/fuel ratio of the exhaust gas is made rich, the NOx adsorbed to the lower layer in the first lean state described above is converted to ammonia by way of hydrogen (Chemical Formula 2) generated by the water-gas shift reaction (Chemical Formula 1) described below, and this ammonia transfers to the upper layer and is stored again by adsorbing to the solid acid. At this time, Pt functions as an $NH_3$ generation catalyst, and the Fe ion-exchanged beta zeolite functions as an $NH_3$ adsorbent.

$$CO+H_2O \rightarrow H_2+CO_2 \quad \text{(Chemical Formula 1)}$$

$$NOx+H_2 \rightarrow NH_3 \quad \text{(Chemical Formula 2)}$$

Second Lean State

In a state in which the air/fuel ratio of exhaust gas is made to be lean again, the ammonia stored again in the upper layer and the NOx contained in the exhaust gas react by way of the ammonia selective catalytic reduction process ($NH_3$—SCR) and convert to nitrogen (Chemical Formula 3), and this nitrogen can be released from the surface of the upper layer. At this time, the Fe ion-exchanged beta zeolite functions as an $NH_3$—SCR catalyst.

$$NOx+NH_3+O_2 \rightarrow N_2+H_2O \quad \text{(Chemical Formula 3)}$$

In the above way, since a sequence of a cycle, which is defined by temporary storage of NOx in the lower layer, conversion to ammonia, storing again of ammonia in the upper layer, and reduction to nitrogen in the upper layer and release, takes place more efficiently according to the catalyst configuration described above, it is possible to improve the NOx decreasing efficiency in the low temperature range as well. It should be noted that the low temperature range in the present invention is no higher than 400° C., and preferably no higher than 300° C.

It should be noted that, in the present invention, the lower layer further may be made as a two layer configuration, and as a three layer configuration of an upper layer, an intermediate layer, and a lower layer, for example. In this case, the amount of Pt in the intermediate layer and lower layer may vary, and the Pt content may be made greater in the intermediate layer than in the lower layer. Furthermore, a configuration may be made in which the lower layer does not contain Pt, and Pt is only contained in the intermediate layer.

In addition, in the above-mentioned embodiment, although an example is noted in which the present invention is applied to a diesel internal combustion engine, it can also be applied to a gasoline internal combustion engine. Furthermore, the present invention can also be applied to air/fuel ratio control of an engine for nautical propulsion such as an outboard engine in which the crank shaft is vertical, or the like.

EXAMPLES

Below, the present invention is explained in further detail by way of an Example.

Example

Preparation of NOx Purifying Catalyst

A catalyst of a two layer configuration identical to that in the above-mentioned Table 1 was produced as the NOx purifying catalyst by way of a well-known conventional slurry method. More specifically, each slurry was produced by mixing materials constituting each catalyst layer with a ball mill, coating this slurry onto the carrier indicated below using a wash coat method so as to make the constituent amounts in the constituent table shown in Table 2 below, and drying and firing under the drying and firing conditions indicated below, thereby preparing the NOx purifying catalyst. It should be noted that each material was mixed with a platinum chloride aqueous solution in the production of slurries used in the low layer of the present example.

Carrier
    Size: 25.4 φ×60 mm (30 cc)
    Wall thickness: 4.3 mils
    Number of cells: 400
    Material: cordierite
    Shape: flow-through honeycomb structure
Drying and Firing Conditions
    Drying temperature: 120° C. (in air)
    Drying time: 1 hour
    Firing apparatus: electric oven
    Firing temperature: 450° C.
    Firing time: 30 minutes

TABLE 2

| | | Proportion (g/L) | |
|---|---|---|---|
| | Composition | Example | Comparative Example |
| Upper Layer | Fe-ion exchanged Beta zeolite | 50 | 50 |
| | $CeO_2$ | 30 | — |
| | $\gamma$-$Al_2O_3$ | 30 | 30 |
| | Zirconia | 5 | 5 |
| Lower Layer | Pt | 4.5 | 4.5 |
| | $CeO_2$ | 120 | 120 |
| | $\gamma$-$Al_2O_3$ | 30 | 30 |

Comparative Example

As shown in Table 2, the NOx purifying catalyst was prepared under similar conditions to the Example except for cerium oxide not being contained in the upper layer.

Test Example 1

A catalyst of the configuration of the above-mentioned Example 1 was operated under the test conditions described below, and the NOx purification performance was evaluated. The results thereof are shown in FIG. 1. Here, the horizontal axis of FIG. 1 is catalyst temperature, and the vertical axis is NOx conversion ratio (vol %).
Test Conditions
Measurement Conditions
    Catalyst temperatures: 5 points total of 200° C., 250° C., 300° C., 350° C., and 400° C.
    Lean/rich ratio: 55 sec/5 sec
Gas Conditions
    Lean state: 6% $O_2$, 6% $CO_2$, 500 ppm $C_3H_6$, 900 ppm CO, 110 ppm NO, 7% $H_2O$, balance $N_2$
    Rich state: 0% $O_2$, 6% $CO_2$, 500 ppm $C_3H_6$, 2% CO, 110 ppm NO, 7% $H_2O$, balance $N_2$ As is evident from the results of FIG. 1, it can be ascertained that, by lean/rich control in a NOx treatment system of the present invention using the catalyst of the Example, the NOx conversion rate is at least 60% in a low temperature range from 200° C. to 350° C., and in particular that the NOx purification performance excels in the low temperature range. In addition, it can be ascertained that the Example containing cerium oxide in the upper layer has a NOx conversion ratio that is further improved in comparison to the Comparative Example not containing cerium oxide in the upper layer.

The invention claimed is:

1. A NOx purifying catalyst used for purification of NOx in exhaust gas emitted from an internal combustion engine in which an air/fuel ratio is controlled to be in a lean or rich state, wherein:
    the catalyst comprises a first catalyst layer and a second catalyst layer;
    NOx passes through the first catalyst layer, and the NOx having thus passed through is oxidized and adsorbed by the second catalyst layer, in the lean state;
    the NOx thus adsorbed by the second catalyst layer is converted to $NH_3$ by a reducing component on the second catalyst layer, and then the $NH_3$ is adsorbed by transferring to the first catalyst layer, in the rich state;
    the $NH_3$ subsequently reacts with NOx to be converted to nitrogen and water;
    the first catalyst layer includes a cerium oxide-based material and a beta zeolite having elemental iron;
    the second catalyst layer includes a noble metal, a cerium oxide-based material, and a heat resistant inorganic oxide; and
    the second catalyst layer and the first catalyst layer are sequentially laminated on a carrier, and the first catalyst layer is formed so as to be a top layer,
    wherein the second catalyst layer is configured so that content of the noble metal decreases sequentially or step-wise from a side of the first catalyst layer toward a carrier side thereof.

2. The NOx purifying catalyst according to claim 1, wherein:
    at least a portion of the beta zeolite in the first catalyst layer is ion-exchanged with elemental iron; and
    in the second catalyst layer, the noble metal has platinum as an essential component, and the heat resistant inorganic oxide is gamma alumina.

3. The NOx purifying catalyst according to claim 1, wherein the beta zeolite having elemental iron in the first catalyst layer further includes elemental cerium.

4. The NOx purifying catalyst according to claim 1, wherein the cerium oxide-based material of the first catalyst layer and the cerium oxide-based material of the second catalyst layer is at least one of cerium oxide, and a composite oxide of a rare-earth element and cerium.

5. The NOX purifying catalyst according to claim 1, wherein the reducing component is at least one component in the exhaust gas selected from the group consisting of carbon monoxide, a hydrocarbon component, and hydrogen generated from at least one of the carbon monoxide and hydrocarbon component contacting the second catalyst layer.

* * * * *